US009747787B2

(12) United States Patent
Desbiolles et al.

(10) Patent No.: US 9,747,787 B2
(45) Date of Patent: Aug. 29, 2017

(54) METHOD FOR CONFIGURING A HOME-AUTOMATION INSTALLATION (71) Applicant: Somfy SAS, Cluses (FR)

(72) Inventors: Arnaud Desbiolles, Cornier (FR); Stephane Marmey, Naves Parmelan (FR); Mickael Mugnier, Saint-Pierre-en-Faucigny (FR)

(73) Assignee: SOMFY SAS, Cluses (FR)

( * ) Notice: Subject to any disclaimer, the term of this patent is extended or adjusted under 35 U.S.C. 154(b) by 18 days.

(21) Appl. No.: 13/777,742

(22) Filed: Feb. 26, 2013

(65) Prior Publication Data
US 2013/0222124 A1 Aug. 29, 2013

(30) Foreign Application Priority Data

Feb. 27, 2012 (FR) ...................................... 12 51751

(51) Int. Cl.
*G08C 19/16* (2006.01)
*H04L 12/28* (2006.01)
*H04L 29/06* (2006.01)
*H04W 12/04* (2009.01)

(52) U.S. Cl.
CPC ............ *G08C 19/16* (2013.01); *H04L 12/282* (2013.01); *H04L 63/068* (2013.01); *H04W 12/04* (2013.01)

(58) Field of Classification Search
CPC .... H04W 12/04; H04L 63/068; H04L 12/282; G08C 19/16
USPC ............ 340/12.1, 12.15, 12.22, 12.23, 12.28
See application file for complete search history.

(56) References Cited

U.S. PATENT DOCUMENTS

| 6,233,685 | B1 * | 5/2001 | Smith et al. | 713/194 |
| 8,552,854 | B2 * | 10/2013 | Autret et al. | 340/539.1 |
| 2007/0097878 | A1 * | 5/2007 | Morioka et al. | 370/254 |

FOREIGN PATENT DOCUMENTS

| WO | WO 03/081352 A2 | 10/2003 |
| WO | WO 03/081352 A3 | 10/2003 |
| WO | WO 2004/109982 A2 | 12/2004 |
| WO | WO 2004/109982 A3 | 12/2004 |

OTHER PUBLICATIONS

Search report issued by French Patent Office on Oct. 17, 2012 for priority application FR 1251751.

\* cited by examiner

*Primary Examiner* — Yong Hang Jiang
(74) *Attorney, Agent, or Firm* — Haug Partners LLP

(57) ABSTRACT

Described are methods, recording media, and devices for configuring a home-automation installation comprising at least one first part of the home-automation installation and one second part of the home-automation installation and one configuration device.

The first part of the home-automation installation comprises elements including a remote control unit and equipment controlled by the remote control unit, communicating over a first home-automation network, the first part having a first key, and the second part of the home-automation installation comprises elements including a remote control unit and equipment controlled by the remote control unit, communicating over a second home-automation network, the second part having a second key.

16 Claims, 3 Drawing Sheets

METHOD FOR CONFIGURING A HOME-AUTOMATION INSTALLATION

This invention claims priority benefits to French Patent Application No. 12 51751 filed Feb. 27, 2012, the entire disclosure of which is incorporated herein by reference.

The invention relates to the field of the remote control of elements of a home-automation installation, notably elements of remote control unit type or equipment controlled by actuators and notably to the wireless control of actuators controlling home-automation equipment, notably screens for closure, for occultation, for sun protection or for projection or devices for lighting, for heating or for air conditioning. The invention relates in particular to a method for configuring a home-automation installation. It also relates to a method for operating a configuration device. It also relates to a configuration device capable of implementing one or the other of these methods. It also relates to an installation capable of implementing one or the other of these methods.

In the current design of such systems, such actuators and/or associated sensors are operated by remote control units, notably remote controls are capable of communicating in reception but also in transmission via a two-way link, typically a radiofrequency link. The actuators or sensors and the control units may therefore be qualified generically as two-way objects. The actuators or sensors are often placed in parts that are arduously accessible for the installer, and even more for the user.

The remote control units are one-way or two-way, mobile or fixed.

A pairing procedure makes it possible to associate at least one common identifier with a pair formed of an item of equipment and a remote control unit. The sharing of a common identifier then makes it possible for the equipment to recognize the commands originating from the remote control unit in order to respond thereto. The pairing procedure may be repeated in order to control several items of equipment from one remote control unit or else for one item of equipment to respond to several remote control units. Depending on the pairing modes, the identifier is transmitted from the equipment control unit to the remote control unit which records it, or on the contrary from the remote control unit to the control unit of the actuator, which records it.

A method is known from document EP1490839 which makes it possible to exclude a remote control unit or an item of equipment from a network, in particular a stolen or lost remote control unit, so that the latter can no longer communicate with the other elements of the network.

However, a problem arises when, in an installation, a first installation part is found to be controlled by virtue of a first key and a second installation part is found to be controlled by virtue of a second key. The two installation parts may cohabit totally, but remain strangers to one another. In certain cases, for example if a remote control unit of the first installation part must be used to control an actuator of the second installation part, or if it is desired to add a new common remote control unit to the two installation parts, it is then necessary to reconfigure at least one of the two parts of the home-automation installation, that is to say to redefine all the links that exist between all the elements of this or of these parts of the installation. This is naturally annoying and typically occurs when several preconfigured installation parts are installed simultaneously or when a second installation part is installed in a building already equipped with a first installation part so as to improve the home-automation functions provided.

The object of the invention is to provide a method for configuring a home-automation installation that remedies the drawbacks mentioned above and that improves the known methods of the prior art. In particular, the invention proposes a simple and effective configuration method, notably a method that is intuitive and limits the need for an installer.

According to the invention, the method governs the configuration of a home-automation installation comprising at least one first part of the home-automation installation, one second part of the home-automation installation and one configuration device. The first part of the home-automation installation comprises elements of remote control unit type or equipment, communicating over a first home-automation network, each element of the first part being provided with an identifier and sharing one and the same first key specific to the first home-automation network and ensuring the belonging of the element to the first home-automation network. The second part of the home-automation installation comprises elements of remote control unit type or equipment, communicating over a second home-automation network, each element of the second part being provided with an identifier and sharing one and the same second key specific to the second home-automation network and ensuring the belonging of the element to the second home-automation network. The method comprises:
  a phase of transmitting the first key, from an element of the first installation part to the configuration device,
  a phase of defining a new key,
  a phase of transmitting the new key, from the configuration device to at least one element of the second installation part,
  a phase of recording the new key in a memory of the at least one element of the second installation part.

The phase of transmitting the first key may be iterated for elements of remote control unit type of the first installation part.

The method may comprise a phase of transmitting the second key from an element of the second installation part to the configuration device.

The phase of transmitting the second key may be iterated for elements of remote control unit type of the second installation part.

The method may comprise a step of transmitting a third key, from an element of a third installation part to the configuration device.

The phase of defining the new key may comprise the generation of a new key, notably a random generation of a new key or the choice of the first key and/or of the second key as the new key.

The phase of transmitting the new key, and/or the phase of recording the new key, may be iterated for several elements of the installation, notably for all the remote control units of the installation comprising elements for receiving information.

The phase of recording the new key may cause the erasure of the first or second key previously in memory.

According to the invention, a method for operating a configuration device capable of implementing the configuration method defined above comprises:
  a phase of receiving the first key,
  a phase of defining a new key,
  a phase of transmitting the new key.

The invention also relates to a data recording medium that can be read by a computer on which a computer program is recorded comprising software elements for implementing the steps of a method defined above.

According to the invention, a configuration device comprises hardware and/or software elements for implementing a method defined above.

The hardware and/or software elements may comprise:
an element for receiving the first key,
an element for defining a new key,
an element for transmitting the new key.

The hardware and/or software elements may comprise a man-machine interface, such as a screen and keypad set, in particular a touch-sensitive screen.

According to the invention, a home-automation installation comprises hardware and/or software elements for implementing a method defined above.

The home-automation installation may comprise a configuration device defined above.

The invention also relates to a computer program comprising a computer program code element suitable for carrying out the steps of the method defined above when the program is executed on a computer.

The invention will be better understood on reading the following description given only as an example and made with reference to the appended drawings in which.

Figure 1:
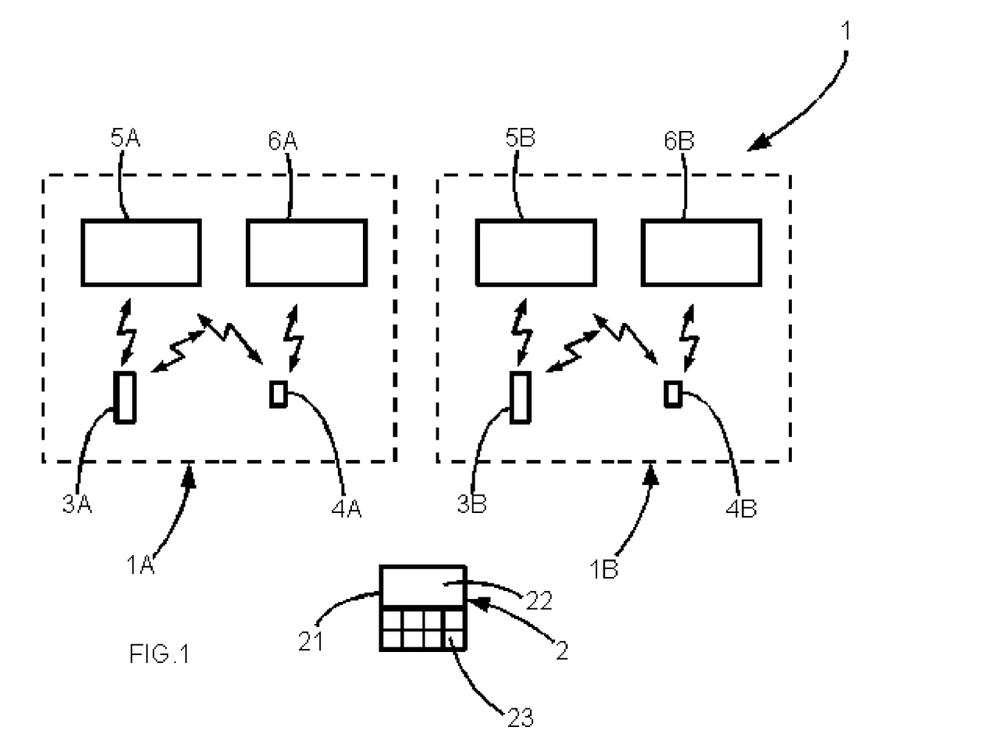
FIG. 1 is a diagram of an embodiment of an installation according to the invention.

FIG. 1 represents in diagrammatic form a home-automation installation 1 according to the invention. FIG. 1 shows a first part 1A of the home-automation installation comprising home-automation elements or items of equipment 3A, 4A, 5A, 6A communicating over a first home-automation network, the home-automation elements forming the first home-automation network. Each element of the first part is provided with an identifier which it shares with one or more other items of equipment of the first part of the installation, and shares one and the same first key specific to the first home-automation network, ensuring the belonging of the element to the first home-automation network. Similarly, a second part 1B of the home-automation installation is shown comprising home-automation elements or items of equipment 3B, 4B, 5B, 6B communicating over a second home-automation network, the home-automation elements forming the second home-automation network. Each element of the second part is provided with an identifier which it shares with one or more other items of equipment of the second part of the installation, and shares one and the same second key specific to the second home-automation network, ensuring the belonging of the element to the second home-automation network.

For example, the first part of the installation comprises two devices of motorized roller blinds 5A and 6A, each capable of being controlled by a remote control 3A or by a remote control 4A. It is also possible more generally to consider the remote controls as being remote control units. The remote controls 3A and 4A are for example two-way remote controls, that is to say a remote control capable not only of transmitting signals, notably electromagnetic signals, but also capable of receiving signals. For example, it is possible to imagine that the first part of the home-automation installation has already been set up in the building in the past.

For example, the second part of the installation comprises a motorized garage door device 5B and a lighting device 6B, each capable of being controlled by a remote control 3B or by a remote control 4B. It is also possible more generally to consider the remote controls as being remote control units. The remote controls 3B and 4B are for example two-way remote controls. For example, it is possible to imagine that the second part of the home-automation installation has just been set up in the building.

The home-automation installation parts may comprise elements of different types, such as actuators, sensors or remote control units. Naturally, the home-automation installation may comprise a much larger number of remote control units and/or of sensors and/or of actuators and may comprise other elements in addition or in place of the elements listed above, notably items of equipment of the actuator type for a patio awning, for water treatment, for ventilation, etc., including of the domestic type such as a washing machine, a television set etc. The invention however preferably applies to elements occupying a fixed place in the building and at least one of the elements being of the type of equipment that can be moved under the action of an electromechanical actuator, that is to say capable of preventing an intrusion, which is here the case of the first four items of equipment. Preferably, the elements are home-automation items of equipment of the closure screen, occultation screen, sun protection screen or projection screen type and their remote controls.

All the elements of the first part communicate with one another over one and the same first home-automation network, of the local type (LAN) and using a common protocol, for example io-homecontrol, EIB, Zigbee etc. (registered trademarks). Preferably, the home-automation network is of the radiofrequency type which is represented by arrows. Alternatively, several local networks of different protocol and/or media are used to form the first home-automation network. The elements therefore each comprise a link element allowing communication in the home-automation network. All the elements of the first part share the first common key. This key is for example a word of 64 or 128 bits, housed in a memory of each element and an authentication algorithm using the first key is used to allow an item of equipment to recognize that a control instruction or any message does indeed come from an element of the same installation.

Hereinafter, for simplification purposes, it will be said that a message "contains the key" or "comprises the key" when the belonging of its sender to the corresponding installation part is verified by using the common key. In practice, this verification is carried out by a dialogue between the sender of the message and its recipient, or is carried out by an encryption of the content of the message with the aid of the key, or else requires both a dialogue and an encryption of the content of the message. The key is therefore not necessarily contained as such in the messages.

In the same way, the elements of the second part of home-automation installation communicate over a second home-automation network, using the same protocol as the first home-automation network. A second key is shared by all the elements of the second home-automation network.

Since the first key and the second key are a priori different, it is not possible to control the elements 5A or 6A with the remote controls 3B or 4B. In the same way, it is not possible to control the elements 5B or 6B with the remote controls 3A or 4A. In order to make this type of control possible, a reconfiguration of the first part of the home-automation installation and/or of the second part of the home-automation installation, including a reconfiguration of pairings, would be necessary.

Figure 2:
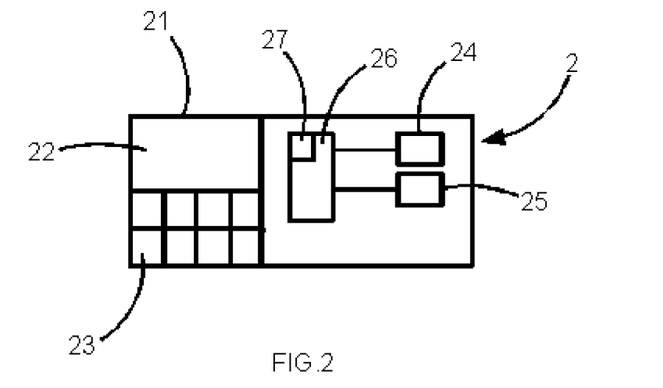
FIG. 2 is a diagram of an embodiment of a configuration device according to the invention.

In order to prevent this drawback, it is possible to reconfigure simply all or part of the installation by using a configuration device 2. This configuration device advantageously forms part of the home-automation installation 1. For example it involves a sophisticated remote control comprising for example a programming (or configuration) interface and a control interface, allowing this remote control to be used as a configuration tool and as a remote control unit in the installation.

The configuration device 2 comprises mainly an element 24 for receiving signals, notably electromagnetic signals, an element 25 for transmitting signals and a computer 26 connected to the transmitting element and to the receiving element. The computer advantageously comprises a memory 27, this memory being designed to store one or more keys. The configuration device also comprises a man-machine interface 21. This interface preferably comprises a screen 22 and a keypad 23. The keypad and screen set may be achieved via a touch-sensitive keypad.

The installation according to the invention, in particular the configuration device according to the invention, also in particular the computer 26 comprise hardware and/or software elements making it possible to govern its operation according to the methods according to the invention. The software elements may notably comprise a computer program code element suitable for carrying out the steps of the method according to the invention, when the program runs on a computer. The hardware elements comprise:

- elements for transmitting the first key, from an element of the first installation part to the configuration device, and/or
- elements for defining a new key, and/or
- elements for transmitting the new key, from the configuration device to at least one element of the second installation part, and/or
- elements for recording the new key in a memory of the at least one element of the second installation part.

Figure 3:
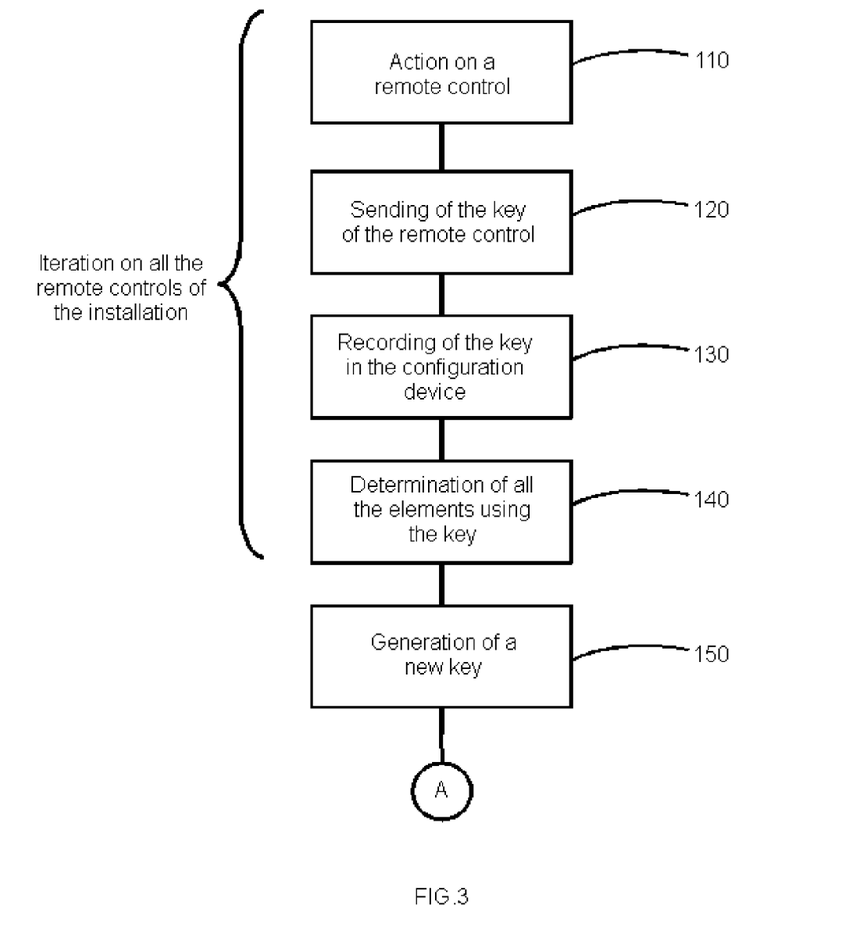
FIG. 3 is a flowchart representing a first part of the steps of one embodiment of a configuration method according to the invention.
Figure 4:
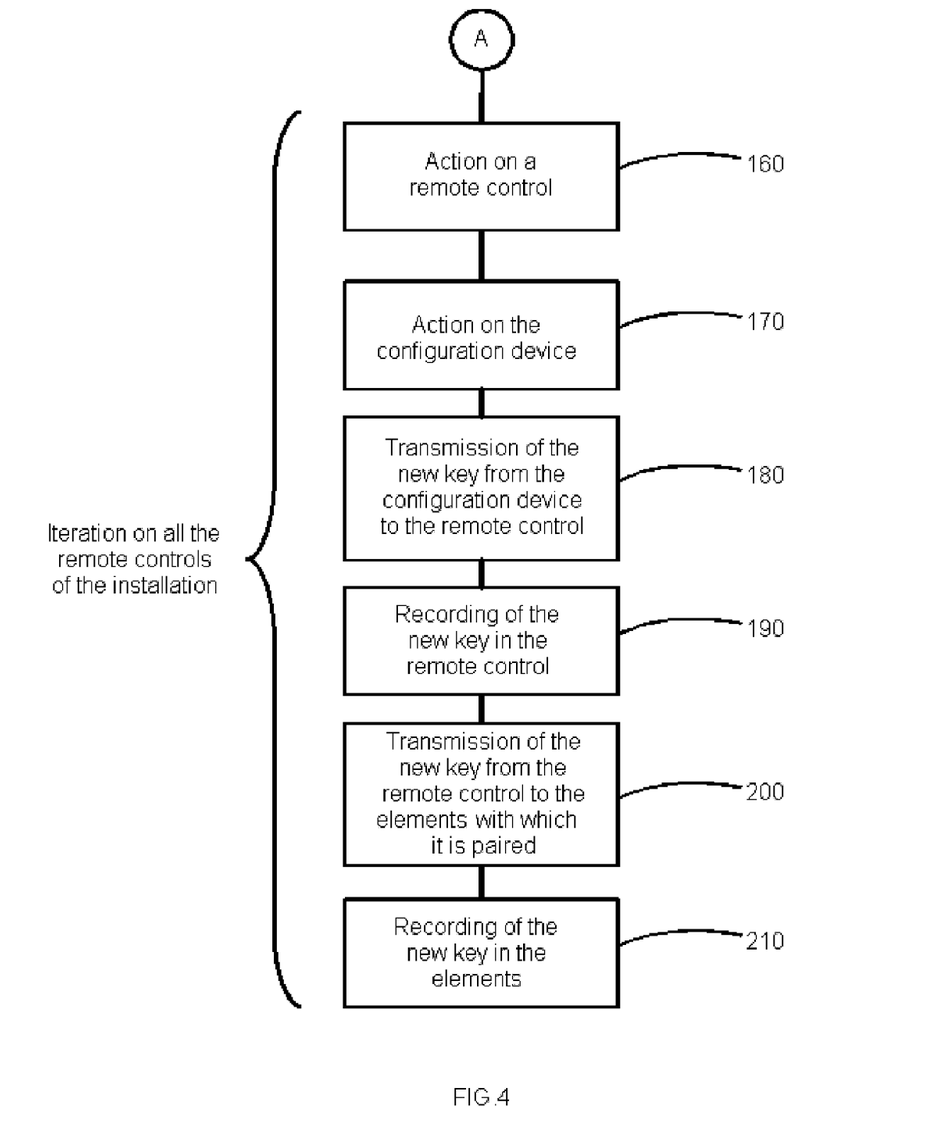
FIG. 4 is a flowchart representing a second part of the steps of the embodiment of the configuration method according to the invention.

One embodiment of a method for configuring an installation according to the invention and an embodiment of a method for operating a configuration device according to the invention are described below with reference to FIGS. 3 and 4.

In a first step 110, a remote control, for example the remote control 3A, is acted upon in order to make it switch into a particular operating mode, called the key transmission mode. This particular operating mode is for example initiated by a particular action of the user on the remote control.

In a second step 120, the particular operation of the remote control involves the transmission by the latter of the first key that it contains in memory.

In a third step 130, action is taken on the configuration device in order to make it switch into a particular operating mode, called listening mode. The first key is then received by the configuration device via the receiving element 24, and the latter records the first key in its memory 27.

In a fourth step 140, a discovery step is implemented. In this discovery step, the configuration device finds all the elements of the installation that are already capable of communicating with the remote control 3A, by virtue notably of these elements sharing the first key with the configuration device. The list of these elements is generated and stored in memory.

In a first phase of the configuration method, called the "key transmission phase", it is possible to reiterate all the steps 110 to 140 on all the remote controls of the installation. In this first phase, the first key is therefore transmitted from an element of the first installation part to the configuration device and the second key from an element of the second installation part to the configuration device. Only one part of the steps may be reiterated, notably it is sufficient to the configuration device to be informed of the existence of a first and of a second key in the installation. This allows the configuration device to ascertain that the first key and the second key differ and to propose homogenizing them.

At the end of this first phase, the configuration device knows all the keys used in the installation and if necessary all the elements communicating with each of the remote controls.

In a fifth step 150, the configuration device generates a new key. This new key may be generated at random or generated in another way. Alternatively, this new key may be chosen by the user. Notably, the new key may be defined as being one of the keys in the configuration device during the first phase of the method, for example the first key. This step constitutes a phase for defining a new key.

In a sixth step 160, action is taken on a remote control, for example the remote control 3A in order to switch it into a particular operating mode, called listening mode. This particular operating mode is for example initiated by a particular action of the user on the remote control. In this particular operating mode, the remote control is listening for the messages transmitted by the other elements of the installation.

In a seventh step 170, action is taken on the configuration device in order to switch it into a particular operating mode, called the key transmission mode. This particular operating is for example initiated by a particular action of the user on the configuration device.

In an eighth step 180, in the particular operating mode, the configuration device transmits the new key to the remote control that is listening.

In a ninth step 190, the remote control records the new key in its memory. For example, the new key replaces the key that was previously stored in memory.

Alternatively, the new key is stored in a memory in addition to the key that was previously stored in memory.

In a tenth step 200, the remote control transmits the new key to the elements with which it was previously paired. The device can verify, with the aid of the list of the elements stored in memory, that the key is indeed broadcast to the elements. Alternatively, the new key may be transmitted to the elements paired with the remote control, directly by the configuration device, the latter having knowledge of these various elements.

In an eleventh step 210, the elements that have received the new key record it in their memory. For example, the new key replaces the key that was previously stored in memory. Alternatively, the new key is stored in a memory in addition to the key that was previously stored in memory.

In a third phase of the configuration method, called the homogenization method, all of the steps 160 to 210 are iterated on all the remote controls of the installation, more exactly on all the two-way remote controls of the installation. Specifically, only the two-way remote controls are capable of receiving the new key. In this last phase, the new key is therefore transmitted from the configuration device to at least one element of the second installation part, notably to a remote control on the second installation part, and the new key is recorded in a memory of the at least one element of the second installation part.

At the end of this third phase, all the two-way remote controls and all the two-way elements know the new key and have stored it in their memory. Thus, any element initially controlled by a two-way remote control may a priori, after implementation of the method, be controlled by another two-way remote control, even though initially this two-way remote control did not use the same key as the controlled element.

The method and the various phases described may also be partially implemented on the basis of one-way remote controls. The items of two-way equipment paired with one-way remote controls may also learn a new key, without compromising the links with the one-way remote control, notably the pairing, or the sharing of a key between the one-way remote control and one or more items of home-automation equipment.

In the example of FIG. 1, after implementation of the configuration method according to the invention, it is a priori possible to control the home-automation element 5B or the home-automation element 6B with the two-way remote control 3A. Similarly, it is a priori possible to control the home-automation element 5A or the home-automation element 6A with the two-way remote control 3B. For this it is sufficient to create a pairing between these elements, that is to say to exchange a common identifier. However, this was not possible before implementing the configuration method according to the invention, the first and second keys previously being different.

As a variant, in the phase for transmitting the new key from the configuration device to at least one element of the second part of the installation, it is possible to iterate a step for receiving the new key on only certain elements of the installation, notably on only certain two-way remote controls. As a consequence, in the recording phase, it is possible to iterate a step for recording the new key only on the remote controls that have received the new key, and on the elements of the installation that are linked to these remote controls. The new key may then be broadcast by means of the remote control that has knowledge of the new key.

Advantageously, the configuration device comprises interface elements capable of guiding the user during the configuration method, notably elements indicating the actions that the user must carry out, such as actions of contacting or pressing on a remote control or on a button of the latter or actions of confirming which initiate reactions of elements of the installation. These interface elements are included in the interface 21.

In order to determine the home-automation elements that are present in the installation or home-automation elements with which one or more remote controls are associated, it is possible to use discovery procedures.

The configuration method is advantageously applied for the homogenization of the keys of an installation comprising at the beginning two or more installation parts that have their own key. By following the steps and by reiterating these steps for all the remote controls of the installation, brought together for the occasion, the method can culminate in a reunification of the keys in a completely transparent manner for the user. Optimally, the generation of a new key is carried out following the transmission of all the various keys of the installation. Thus, for example, the key most commonly used in the installation will be chosen as the new key.

The invention claimed is:

1. A method for configuring elements of a home-automation installation to communicate with a new key, the home-automation installation comprising at least one first part of the home-automation installation, one second part of the home-automation installation and one configuration device, both the first part and the second part being in a same building:
- the first part of the home-automation installation comprising elements including a first remote control unit and equipment controlled by the first remote control unit, communicating over a first home-automation network, each element of the first part being provided with an identifier and sharing the same first key specific to the first home-automation network and ensuring the belonging of the element to the first home-automation network, and
- the second part of the home-automation installation comprising elements including a second remote control unit and equipment controlled by the second remote control unit, communicating over a second home-automation network, each element of the second part being provided with an identifier and sharing the same second key specific to the second home-automation network and ensuring the belonging of the element to the second home-automation network,
- wherein elements of the second part of the home-automation installation are not controlled by the first remote control,
- wherein elements of the first part of the home-automation installation are not controlled by the second remote control, and
- wherein the first and second parts of the home-automation installation are defined by the first key and the second key;
- the method comprises:
- a phase of transmitting the first key, from an element of the first installation part to the configuration device,
- a phase of transmitting the second key, from an element of the second installation part to the configuration device,
- a phase of determining that the first key and the second key are different,
- a phase of defining a new key at the configuration device based upon the determination that the first key and second key are different,
- a phase of transmitting the new key, from the configuration device to at least one element of the first installation part, wherein the at least one element of the first installation part includes the first remote control,
- a phase of transmitting the new key, from the configuration device to at least one element of the second installation part, wherein the at least one element of the second installation part includes the second remote control,
- a phase of recording the new key in a memory of the at least one element of the second installation part, and
- a phase of recording the new key in a memory of the at least one element of the first installation part when the new key is different from the first key and the second key, and
- a phase of pairing the first remote control unit to at least one element of the second installation part or pairing the second remote control unit to at least one element of the first installation pail after the new key has been recorded,
- wherein the phase of pairing comprises exchanging a common identifier,
- wherein elements of the first and the second parts of the home-automation installation communicate using the new key so they communicate over a common home-automation network, and wherein the new key is selected from the group consisting of the first key and a key different from both the first key and the second key.

2. The method according to claim 1, wherein the phase of transmitting the first key is iterated for elements of first remote control unit of the first installation part.

3. The method according to claim 1, wherein the method comprises a phase of transmitting the second key, from an element of the second installation part to the configuration device.

4. The method according to claim 3, wherein the phase of transmitting the second key is iterated for elements of second remote control unit of the second installation part.

5. The method according to claim 1, wherein the method comprises a step of transmitting a third key, from an element of a third installation part to the configuration device.

6. The method according to claim 1, wherein the phase of defining the new key comprises the generation of a new key, including a random generation of a new key or the choice of the first key and/or of the second key as the new key.

7. The method according to claim 1, wherein the phase of transmitting the new key, and/or the phase of recording the new key, is iterated for several elements of the installation, including for all the remote control units of the installation comprising elements for receiving information.

8. The method according to claim 1, wherein the phase of recording the new key causes the erasure of the first or second key previously in memory.

9. Method for operating a configuration device capable of implementing the configuration method according to claim 1, wherein the method comprises:
   a phase of receiving the first key,
   a phase of defining a new key,
   a phase of transmitting the new key.

10. A non-transitory data recording medium on which a computer program is recorded, the program configured to implement a method for configuring elements of a home-automation installation to communicate with a new key, the home-automation installation comprising at least one first part of the home-automation installation, one second part of the home-automation installation and one configuration device, both the first part and the second part being in a same building:
    the first part of the home-automation installation comprising elements including a first remote control unit and equipment controlled by the first remote control unit, communicating over a first home-automation network, each element of the first part being provided with an identifier and sharing the same first key specific to the first home-automation network and ensuring the belonging of the element to the first home-automation network, and
    the second part of the home-automation installation comprising elements including a second remote control unit and equipment controlled by the second remote control unit, communicating over a second home-automation network, each element of the second part being provided with an identifier and the same second key specific to the second home-automation network and ensuring the belonging of the element to the second home-automation network,
    wherein elements of the second part of the home-automation installation are not controlled by the first remote control,
    wherein elements of the first part of the home-automation installation are not controlled by the second remote control, and
    wherein the first and second parts of the home-automation installation are defined by the first key and the second key;
    the method comprises:
    a phase of transmitting the first key, from an element of the first installation part to the configuration device,
    a phase of transmitting the second key, from an element of the second installation part to the configuration device,
    a phase of determining that the first key and the second key are different,
    a phase of defining a new key at the configuration device based upon the determination that the first key and second key are different,
    a phase of transmitting the new key, from the configuration device to at least one element of the first installation part, wherein the at least one element of the first installation part includes the first remote control,
    a phase of transmitting the new key, from the configuration device to at least one element of the second installation part, wherein the at least one element of the second installation part includes the second remote control, and
    a phase of recording the new key in a memory of the at least one element of the second installation part,
    a phase of recording the new key in a memory of the at least one element of the first installation part when the new key is different from the first key and the second key, and
    a phase of pairing the first remote control unit to at least one element of the second installation part or pairing the second remote control unit to at least one element of the first installation part after the new key has been recorded,
    wherein the phase of pairing comprises exchanging a common identifier,
    wherein elements of the first and the second parts of the home-automation installation communicate using the new key so they communicate over a common home-automation network, and
    wherein the new key is selected from the group consisting of the first key and a key different from both the first key and the second key.

11. A configuration device configured to implement a method for configuring elements of a home-automation installation to communicate with a new key, the home-automation installation comprising at least one first part of the home-automation installation, one second part of the home-automation installation and one configuration device, both the first part and the second part being in a same building
    the first part of the home-automation installation comprising elements including a first remote control unit and equipment controlled by the first remote control unit, communicating over a first home-automation network, each element of the first part being provided with an identifier and sharing the same first key specific to the first home-automation network and ensuring the belonging of the element to the first home-automation network, and
    the second part of the home-automation installation comprising elements including a second remote control unit and equipment controlled by the second remote control unit, communicating over a second home-automation network, each element of the second part being provided with an identifier and sharing the same second key specific to the second home-automation network and ensuring the belonging of the element to the second home-automation network, wherein elements of the second part of the home-automation installation are not controlled by the first remote control, wherein elements of the first part of the home-automation installation are not controlled by the second remote control, and wherein the first and second parts of the home-automation installation are defined by the first key and the second key;

the method comprises:

a phase of transmitting the first key, from an element of the first installation part to the configuration device, a phase of transmitting the second key, from an element of the second installation part to the configuration device, a phase of determining that the first key and the second key are different, a phase of defining a new key at the configuration device based upon the determination that the first key and second key are different, a phase of transmitting the new key, from the configuration device to at least one element of the first installation part, wherein the at least one element of the first installation part includes the first remote control, a phase of transmitting the new key, from the configuration device to at least one element of the second installation part, wherein the at least one element of the second installation part includes the second remote control, a phase of recording the new key in a memory of the at least one element of the second installation part, a phase of recording the new key in a memory of the at least one element of the first installation part when the new key is different from the first key and the second key, and a phase of pairing the first remote control unit to at least one element of the second installation part or pairing the second remote control unit to at least one element of the first installation part after the new key has been recorded, wherein the phase of pairing comprises exchanging a common identifier, wherein elements of the first and the second parts of the home-automation installation communicate using the new key so they communicate over a common home-automation network, and wherein the new key is selected from the group consisting of the first key and a key different from both the first key and the second key.

12. A configuration device according to claim 11, wherein hardware and/or software elements of the configuration device comprise:

an element for receiving the first key, an element for defining a new key, an element for transmitting the new key.

13. A configuration device according to claim 11, wherein hardware and/or software elements of the configuration device comprise a man-machine interface comprising a touchscreen and a keypad.

14. A home-automation installation comprising a configuration device according to claim 11.

15. A method for synchronizing keys to enable communication between elements of a home-automation installation, the home-automation installation having two home-automation networks with respective keys for identifying elements that communicate over each respective network, wherein the two home-automation networks are defined by their respective keys, the method comprising:

a configuration device receiving a first key used by elements that communicate over the first home-installation network from an element of a first home-installation network;

the configuration device receiving a second key used by elements that communicate over the second home-installation network from an element of a second home-installation network;

determining that the first key and the second key are different;

defining a new key based upon the determination that the first key and second key are different;

transmitting the new key to at least one element of the first installation part, wherein the at least one element of the first installation part includes a first remote control, transmitting the new key to at least one element of the second home-installation network, wherein the at least one element of the second installation part includes a second remote control, and changing the second key to the new key so that elements that communicate over the second home-installation network use the new key, and recording the new key in a memory of the at least one element of the second installation network, wherein the new key is selected from the group consisting of the first key and a key different from both the first key and the second key, and recording the new key in a memory of the at least one element of the first installation part when the new key is different from the first key and the second key, and pairing at least one element from the first home-installation network to at least one element from the second home-installation network after the new key has been recorded, wherein the pairing comprise exchanging a common identifier.

16. The method according to claim 1, wherein the phase of transmitting the first key, from an element of the first installation part to the configuration device, comprises transmitting the first key from the first remote control unit to the configuration device.

* * * * *

UNITED STATES PATENT AND TRADEMARK OFFICE
CERTIFICATE OF CORRECTION

| | | |
|---|---|---|
| PATENT NO. | : 9,747,787 B2 | Page 1 of 1 |
| APPLICATION NO. | : 13/777742 | |
| DATED | : August 29, 2017 | |
| INVENTOR(S) | : Desbiolles et al. | |

It is certified that error appears in the above-identified patent and that said Letters Patent is hereby corrected as shown below:

In the Claims

In Claim 1, Column 8, Line 52, please delete the word "and".

In Claim 1, Column 8, Line 60, please change "of the first installation pail after the new key has been recorded," to read --of the first installation part after the new key has been recorded,--.

Signed and Sealed this
Seventeenth Day of May, 2022

Katherine Kelly Vidal
*Director of the United States Patent and Trademark Office*